Jan. 19, 1932. J. DE FRANCISCI 1,841,882
HYDRAULIC MOTOR
Filed March 8, 1926
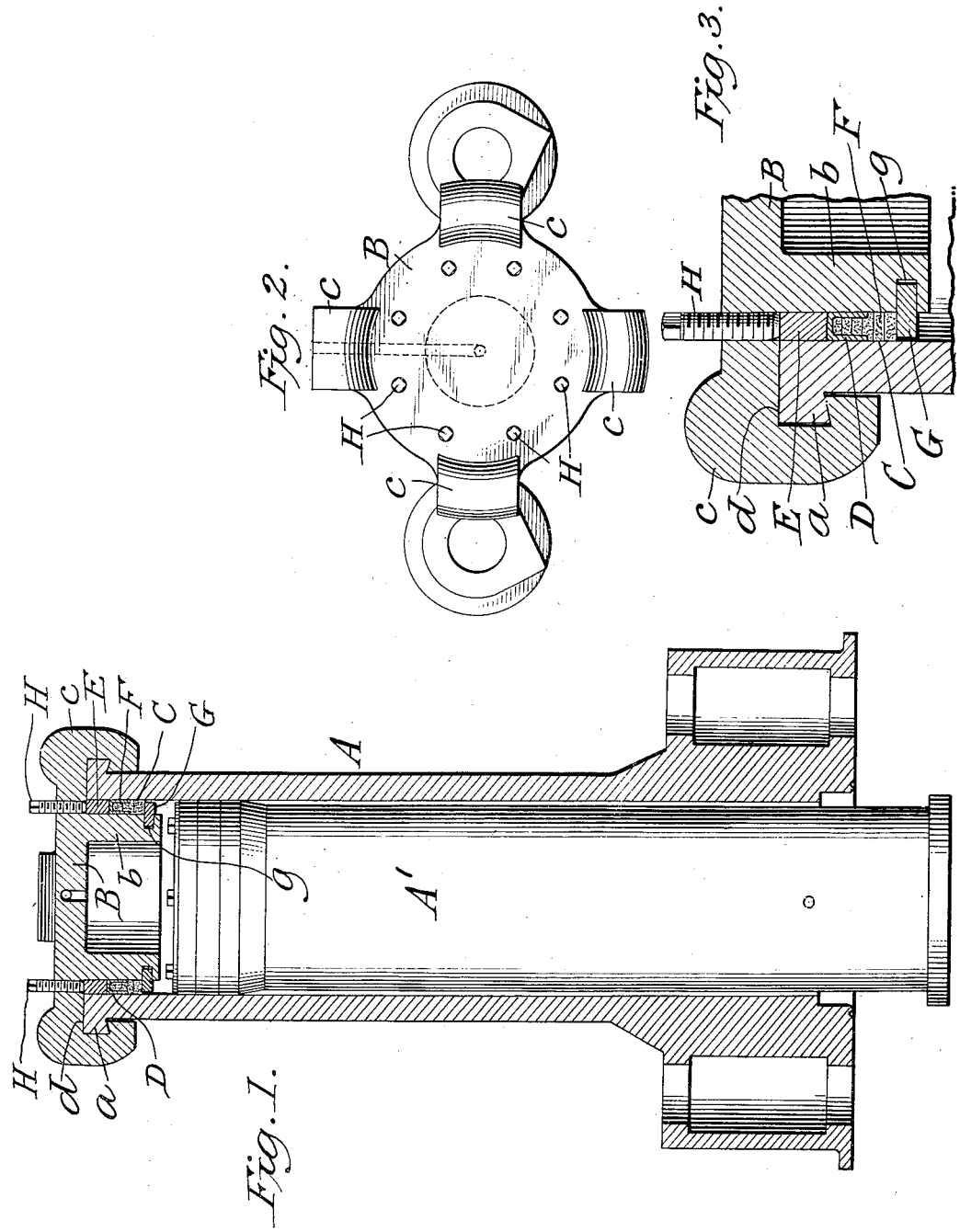
INVENTOR,
Joseph De Francisci,
BY
ATTORNEY.

Patented Jan. 19, 1932

1,841,882

UNITED STATES PATENT OFFICE

JOSEPH DE FRANCISCI, OF BROOKLYN, NEW YORK

HYDRAULIC MOTOR

Application filed March 8, 1926. Serial No. 93,110.

This invention is a cylinder especially adapted for hydraulic motors, but the invention is useful in other structures wherein pressure of one kind or another exists in the operation of such structures.

In the service of hydraulic motors for machinery of various kinds, difficulty exists in the service of the motor because of a reduction in pressure occasioned by leakage of the fluid through the joint intermediate the cylinder and the head therefor, and many attempts have been made to pack the joint for overcoming such leakage. Among such prior efforts at a solution of the problem, screw devices have been used for bolting the head to the cylinder, but in the service of the mechanism the fluid pressure has a tendency to dislodge or to elongate the screw devices, with the result that the joint is so affected as to permit leakage of the fluid, particularly when it is under considerable or high pressure.

My invention seeks to overcome the foregoing objections by the provision of a packing embodying a plurality of co-operable elements so related as to utilize the pressure of the fluid for expanding one or more elements to attain the desirable non-leakage connection between the cylinder and the head.

Other functions and advantages of the invention will appear from the following description taken in connection with the drawings, wherein Figure 1 is a longitudinal section through a hydraulic motor illustrating my improved non-leaking connection between the motor cylinder and the head therefor.

Figure 2 is a plan view.

Figure 3 is an enlarged detail sectional view of the packed joint.

As shown, the cylinder A is open at one end, and at or near said open end, the cylinder is provided with a plurality of lugs $a$, the latter being usually cast in one piece with the wall of the cylinder. Said lugs $a$ extend radially from the cylinder, exteriorly thereof, and they are spaced equidistantantly, preferably, to facilitate the operations of locking a head B to, and unlocking the same from, the cylinder. A plunger or ram A' operates as usual within the cylinder.

The head B is a casting of the required dimensions and weight to withstand the pressure of the fluid. As shown, said head is provided with a solid substantial flange $b$, and with a plurality of lugs $c$, the lugs and the flange being separated or spaced to provide on the under surface of the head a flat face $d$ to have direct contact with the end face of cylinder A, see Figures 1 and 3. The flange $b$ extends downwardly from the head, and said flange is of such diameter relatively to the cylinder diameter, that the flange extends into the cylinder and is spaced relatively thereto, it being understood that the external diameter of the flange is appreciably less than the internal diameter of the cylinder, whereby the assemblage of the head to the cylinder positions the flange $b$ within said cylinder and in spaced relation thereto so as to produce an annular packing-receiving chamber or space C. The lugs $c$ of head B are spaced with respect to each other, said lugs of the head corresponding in number and in spacing to the lugs $a$ of the cylinder, as a result of which the head may be positioned relatively to the cylinder, in the operation of assembling the parts, in such manner that the lugs $c$ will pass the lugs $a$ so that the under face $d$ of the head is in direct contact with the end face of the cylinder, whereupon a partial rotative movement is given to the head in a direction to bring the lugs $c$ into engagement with lugs $a$, as in Figure 1, to thereby positively interlock the head to the cylinder. Such interlocking connection between the head and the cylinder provides means by which the dislodgment of the head is precluded under the pressure of the motive fluid. Obviously, the head B may be assembled with facility and locked positively and detachably to the cylinder, and in like manner the head may be turned in a direction to free the lugs $c$ from engagement with lugs $a$, and thereupon the head may be lifted off the cylinder for dismounting said head.

Within the chamber C are the several elements of the expansible packing, the latter including a channeled ring D, a backing ring E, a fibrous packing material F, and a radially positioned member G bridging the space between the cylinder and the lower part of the head-flange $b$.

The backing ring E occupies the space at the upper part of the chamber C, and said ring affords a seat or substantial bearing for the expansible ring D. Said ring D is of channeled formation in cross section, and it is arranged within the chamber C for the wings of the channel to have frictional engagement with the opposing surfaces of the cylinder A and flange $b$ of head B, the closed face or edge of said expansible ring being in solid contact with the under ridge of the backing ring. The member G is fitted in an annular groove $g$ provided in the lower part of flange $b$ so as to hold the member in place relatively to the cylinder. Between the member G and the expansible ring D is packed the loose material F, the same being composed of any material suitable for the purpose.

In the use of the device, the fluid present within the cylinder has an appreciable leakage around the member G into the annular space C, and thus the pressure of the fluid is applied to the loose packing F and to the inner surfaces of the channeled ring D for expanding the said packing material and the ring into tight frictional engagement with the walls of the cylinder A and the flange $b$, the effect of which is to preclude leakage of the fluid through the joint intermediate the cylinder and the head.

The packing material F is compressed initially and mechanically between the member G and the expansible ring by a relative adjustment of ring D to member G, such adjustment being effected by a number of screws H which engage with backing ring E. The screws are supported in openings tapped in the head B in alignment vertically with the ring B, and these screws are accessible outside of the head, so that after assemblage of the various parts, the screws may be rotated by hand in a direction to move the ring E inwardly of annular space C, and thus effect the inward movement of rings E, D, for initially compressing the loose packing material between ring E and member G.

The several parts of the packing means are readily assembled with respect to the head and to each other. After the head is positioned upon the cylinder and locked thereto, the screws H are rotated in the head for imparting movement to the backing ring E and the channeled ring D for initially compressing the relatively loose material, and thereafter the packing means are exposed to the pressure of the fluid within the cylinder, the effect of which is to expand the channeled ring D and to further compress the packing material, whereby the packing means afford the required tight connection between cylinder A and head B to preclude leakage. The thrust of the fluid upon the head is taken up by the direct connection between cylinder and head afforded by the interlocking lugs $a$, $c$, said head being removable as and when required for obtaining access to the cylinder or the ram.

Having thus fully described the invention, what I claim as new and desire to secure by Letters Patent is:

1. A device of the character described, comprising a cylinder, a head spaced therefrom to provide a packing-receiving space, an expansible ring therein, a flat ring in said space, packing between said two rings, said flat ring being adapted to permit the leakage of pressure which forces said packing to expand said expansible ring and prevent the leakage of pressure past the expansible ring.

2. A device of the character described, comprising a cylinder, a head mounted thereon and spaced therefrom to provide a packing-receiving space, a rigid backing ring therein, an expansible annular member adjacent said backing ring, a flat ring spaced from said annular member and packing between said flat ring and said annular member.

3. A device of the character described, comprising a cylinder, a head spaced therefrom to provide a packing-receiving space, an expansible channeled member, packing within said space, and means for confining said channeled member and packing within the space, said means including a ring permitting leakage of pressure which forces said packing to expand the expansible channelled member and prevent leakage of pressure past the expansible member.

4. A device of the character described, comprising a cylinder, a head spaced therefrom to provide a packing-receiving space, an expansible metallic packing member in said space, packing, means for retaining said packing in said space including a flat ring which is received in said space relatively loosely to permit pressure from the cylinder to expand said expansible metal packing member to prevent the leakage of pressure past the expansible packing member.

5. A device of the character described, including, a cylinder, a head spaced therefrom to provide a packing-receiving space and provided with a groove, an expansible ring in said space, a flat ring in said groove in said head, packing between said two rings, said flat ring being adapted to permit the leakage of pressure which forces said packing to expand said expansible ring and prevent the leakage of pressure past the expansible ring.

6. A device of the character described, including, a cylinder, a head mounted thereon and projecting into said cylinder, said head being concentric with and spaced from said cylinder to provide a packing-receiving space, a rigid backing ring therein, an expansible annular member adjacent said backing ring, a flat ring spaced from said annular member, and packing between said flat ring and said annular member.

In testimony whereof I have hereto signed my name this 5th day of March, 1926.

JOSEPH DE FRANCISCI.